United States Patent
Chang et al.

(10) Patent No.: US 9,968,916 B2
(45) Date of Patent: May 15, 2018

(54) THREE-WAY CATALYST AND ITS USE IN EXHAUST SYSTEMS

(71) Applicant: Johnson Matthey Public Limited Company, London (GB)

(72) Inventors: Hsiao-Lan Chang, Wayne, PA (US); Hai-Ying Chen, Wayne, PA (US); Kwangmo Koo, Wayne, PA (US); Jeffery Scott Rieck, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days. days.

(21) Appl. No.: 15/350,825

(22) Filed: Nov. 14, 2016

(65) Prior Publication Data

US 2017/0056866 A1    Mar. 2, 2017

Related U.S. Application Data

(63) Continuation of application No. 14/528,139, filed on Oct. 30, 2014, now abandoned.

(60) Provisional application No. 61/897,543, filed on Oct. 30, 2013.

(51) Int. Cl.
| | |
|---|---|
| *B01D 53/94* | (2006.01) |
| *B01J 29/74* | (2006.01) |
| *B01J 37/02* | (2006.01) |
| *B01J 35/00* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 35/04* | (2006.01) |
| *B01J 37/00* | (2006.01) |
| *B01J 21/04* | (2006.01) |
| *B01J 23/10* | (2006.01) |
| *B01J 37/08* | (2006.01) |
| *F01N 3/10* | (2006.01) |
| *F01N 3/035* | (2006.01) |
| *F01N 3/08* | (2006.01) |
| *F01N 3/28* | (2006.01) |

(52) U.S. Cl.
CPC ........ *B01J 29/7415* (2013.01); *B01D 53/945* (2013.01); *B01D 53/9481* (2013.01); *B01J 21/04* (2013.01); *B01J 23/10* (2013.01); *B01J 23/40* (2013.01); *B01J 23/42* (2013.01); *B01J 23/44* (2013.01); *B01J 23/464* (2013.01); *B01J 23/63* (2013.01); *B01J 35/0006* (2013.01); *B01J 35/04* (2013.01); *B01J 37/0009* (2013.01); *B01J 37/0201* (2013.01); *B01J 37/0207* (2013.01); *B01J 37/0209* (2013.01); *B01J 37/0217* (2013.01); *B01J 37/0236* (2013.01); *B01J 37/0244* (2013.01); *B01J 37/0248* (2013.01); *B01J 37/082* (2013.01); *F01N 3/101* (2013.01); *B01D 2255/104* (2013.01); *B01D 2255/1021* (2013.01); *B01D 2255/1023* (2013.01); *B01D 2255/1025* (2013.01); *B01D 2255/40* (2013.01); *B01D 2255/50* (2013.01); *B01D 2255/502* (2013.01); *B01D 2255/504* (2013.01); *F01N 3/035* (2013.01); *F01N 3/0814* (2013.01); *F01N 3/2882* (2013.01); *F01N 2570/14* (2013.01); *Y02T 10/22* (2013.01)

(58) Field of Classification Search
CPC ........ B01J 23/40; B01J 23/44; B01J 37/0244; B01D 53/9481
USPC .............................. 422/169, 171; 502/65, 74
See application file for complete search history.

(56) References Cited

U.S. PATENT DOCUMENTS

| | | | |
|---|---|---|---|
| 6,009,742 A | 1/2000 | Balko | |
| 6,074,973 A * | 6/2000 | Lampert | B01D 53/945 423/213.2 |
| 2010/0199839 A1* | 8/2010 | Zhang | F01N 3/0233 95/23 |
| 2011/0237425 A1* | 9/2011 | Kikuchi | B01D 53/9418 502/65 |
| 2012/0117953 A1* | 5/2012 | Andersen | B01J 23/30 60/299 |
| 2012/0251419 A1* | 10/2012 | Kunieda | F01N 3/0222 423/213.5 |

FOREIGN PATENT DOCUMENTS

| | | |
|---|---|---|
| EP | 0601314 A1 | 6/1994 |
| EP | 0849587 A | 6/1998 |
| EP | 0849588 A2 | 6/1998 |
| EP | 0914864 A2 | 5/1999 |
| EP | 1027930 A1 | 8/2000 |
| JP | H07155613 A | 6/1995 |

* cited by examiner

Primary Examiner — Tom P Duong

(57) ABSTRACT

A three-way catalyst is disclosed. The three-way catalyst comprises a silver-containing extruded zeolite substrate and a catalyst layer disposed on the silver-containing extruded zeolite substrate. The catalyst layer comprises a supported platinum group metal catalyst comprising one or more platinum group metals and one or more inorganic oxide carriers. The invention also includes an exhaust system comprising the three-way catalyst. The three-way catalyst results in improved hydrocarbon storage and conversion, in particular during the cold start period.

19 Claims, No Drawings

THREE-WAY CATALYST AND ITS USE IN EXHAUST SYSTEMS

CROSS-REFERENCE TO RELATED APPLICATIONS

This application is a continuation of U.S. patent application Ser. No. 14/528,139, filed Oct. 30, 2014, and claims priority benefit of U.S. Provisional Patent Application No. 61/897,543, filed Oct. 30, 2013, the disclosures of which are incorporated herein by reference in their entireties for all purposes.

FIELD OF THE INVENTION

The invention relates to a three-way catalyst and its use in an exhaust system for internal combustion engines.

BACKGROUND OF THE INVENTION

Internal combustion engines produce exhaust gases containing a variety of pollutants, including hydrocarbons, carbon monoxide, and nitrogen oxides ("$NO_x$"). Emission control systems, including exhaust gas catalysts, are widely utilized to reduce the amount of these pollutants emitted to atmosphere. A commonly used catalyst for gasoline engine applications is the "three-way catalyst" (TWC). TWCs perform three main functions: (1) oxidation of CO; (2) oxidation of unburnt hydrocarbons; and (3) reduction of $NO_x$ to $N_2$.

TWCs, like other exhaust gas catalysts, typically achieve very high efficiencies once they reach their operating temperature (typically, 200° C. and higher). However, these systems are relatively inefficient below their operating temperature (the "cold start" period). As even more stringent national and regional legislation lowers the amount of pollutants that can be emitted from diesel or gasoline engines, reducing emissions during the cold start period is becoming a major challenge. Thus, methods for reducing the level of $NO_x$ and hydrocarbons emitted during cold start condition continue to be explored.

For cold start hydrocarbon control, hydrocarbon (HC) traps including zeolites as hydrocarbon trapping components have been investigated. In these systems, the zeolite component adsorbs and stores hydrocarbons during the start-up period and releases the stored hydrocarbons when the exhaust temperature is high enough to desorb hydrocarbons. The desorbed hydrocarbons are subsequently converted by a TWC component either incorporated into the HC trap or by a separate TWC placed downstream of the HC trap.

For instance, U.S. Pat. No. 5,772,972 discloses a hybrid system of hydrocarbon trapping material and palladium based three-way catalyst material. U.S. Pat. No. 6,617,276 teaches a catalyst structure comprising a first layer consisting essentially of a hydrocarbon-adsorbing zeolite and a K, Rb, or Cs active metal that is impregnated on the zeolite, at least one additional layer consisting essentially of at least one platinum group metal, and a catalyst substrate on which the first layer and the one or more additional layers are disposed. In EP 1129774, a hydrocarbon adsorbing member is taught that comprises a zeolite having $SiO_2:Al_2O_3$ molar ratio of 100 or more and an average primary particle diameter of 1 μm or less of, and that it is free from a monovalent metallic element. U.S. Pat. No. 6,074,973 teaches a catalyzed hydrocarbon trap material comprising palladium and silver dispersed on a high surface area metal oxide support and a zeolite material such as one or more of ZSM-5, Beta, Y, and other suitable zeolites.

U.S. Appl. Pub. No. 2012/0117953 A1 teaches a three way catalyst that comprises an extruded solid body comprising 10-100 weight percent of at least one binder/matrix component, 5-90 weight percent of a zeolitic molecular sieve, a non-zeolitic molecular sieve or a mixture of any two or more thereof, and 0-80 weight percent of an optional stabilized ceria. The catalyst comprises at least one precious metal and optionally at least one non-precious metal, wherein: (i) the at least one precious metal is carried in one or more coating layer(s) on a surface of the extruded solid body; (ii) at least one metal is present throughout the extruded solid body and at least one precious metal is also carried in one or more coating layer(s) on a surface of the extruded solid body; or (iii) at least one metal is present throughout the extruded solid body, is present in a higher concentration at a surface of the extruded solid body and at least one precious metal is also carried in one or more coating layer(s) on the surface of the extruded solid body. In addition, U.S. Appl. Pub. No. 2012/0308439 A1 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

As with any automotive system and process, it is desirable to attain still further improvements in exhaust gas treatment systems, particularly under cold start conditions. We have discovered a new three-way catalyst that provides enhanced cleaning of the exhaust gases from internal combustion engines.

SUMMARY OF THE INVENTION

The invention is a three-way catalyst for use in an exhaust system. The three-way catalyst comprises a silver-containing extruded zeolite substrate. The three-way catalyst also comprises a catalyst layer that is disposed on the silver-containing extruded zeolite substrate. The catalyst layer comprises a supported platinum group metal catalyst comprising one or more platinum group metals and one or more inorganic oxide carriers. The invention also includes an exhaust system comprising the three-way catalyst.

DETAILED DESCRIPTION OF THE INVENTION

The three-way catalyst of the invention comprises a silver-containing extruded zeolite substrate.

The zeolite of the silver-containing extruded zeolite substrate may be any natural or a synthetic zeolite, including molecular sieves, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms. The zeolite frameworks are typically anionic, which are counterbalanced by charge compensating cations, typically alkali and alkaline earth elements (e.g., Na, K, Mg, Ca, Sr, and Ba) and also protons.

The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), an AEI framework zeolite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the zeolites are beta zeolite, ZSM-5 zeolite, or SSZ-33, or Y-zeolite. The zeolite is most preferably beta zeolite, ZSM-5 zeolite, or SSZ-33.

The extruded zeolite substrate may be formed by any known means. Typically, the zeolite is extruded to form a flow-through or filter substrate, and is preferably extruded to form a honeycomb flow-through monolith. Extruded zeolite substrates and honeycomb bodies, and processes for making them, are known in the art. See, for example, U.S. Pat. Nos. 5,492,883, 5,565,394, and 5,633,217 and U.S. Pat. No. Re. 34,804. Typically, the zeolite material is mixed with a permanent binder such as silicone resin and a temporary binder such as methylcellulose, and the mixture is extruded to form a green honeycomb body, which is then calcined and sintered to form the final extruded zeolite substrate.

The extruded zeolite substrate may be formed as a flow-through or filter substrate. If formed as a flow-through substrate, it is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

If formed as a filter substrate, the silver-containing extruded zeolite substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The zeolite may contain silver prior to extruding such that the silver-containing extruded zeolite substrate is produced by the extrusion procedure. If the zeolite contains silver prior to extrusion, the silver may be added to the zeolite to form a silver-containing zeolite by any known means, the manner of addition is not considered to be particularly critical. For example, a silver compound (such as silver nitrate) may be added to the zeolite by impregnation, adsorption, ion-exchange, incipient wetness, precipitation, or the like.

If an extruded zeolite substrate is first formed without silver, the extruded zeolite monolith is then loaded with silver to produce the silver-containing extruded zeolite substrate. Preferably, the extruded zeolite monolith is subjected to an impregnation procedure to load silver onto the zeolite monolith.

Preferably, the silver-containing extruded zeolite substrate comprises from 1 to 700 $g/ft^3$ silver, more preferably from 10 to 200 $g/ft^3$ silver.

The three-way catalyst also comprises a catalyst layer that is disposed on the silver-containing extruded zeolite substrate. The catalyst layer comprises a supported platinum group metal catalyst. The supported platinum group metal catalyst comprises one or more platinum group metals ("PGM") and one or more inorganic oxide carriers. The PGM may be platinum, palladium, rhodium, or combinations thereof, and most preferably palladium and rhodium. The inorganic oxide carriers most commonly include oxides of Groups 2, 3, 4, 5, 13 and 14 elements. Useful inorganic oxide carriers preferably have surface areas in the range 10 to 700 $m^2/g$, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria-zirconia are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a palladium compound (such as palladium nitrate) may be supported on an inorganic oxide by impregnation, adsorption, ion-exchange, incipient wetness, precipitation, or the like. Other metals may also be added to the supported PGM catalyst.

The supported PGM catalyst layer is disposed on the silver-containing extruded zeolite substrate. The supported PGM catalyst layer may be disposed on the silver-containing extruded zeolite substrate by processes well known in the prior art. Preferably, the supported platinum group metal catalyst is coated onto the silver-containing extruded zeolite substrate using a washcoat procedure to produce a three-way catalyst of the invention.

A representative process for preparing the three-way catalyst using a washcoat procedure is set forth below. It will be understood that the process below can be varied according to different embodiments of the invention.

The washcoating procedure is preferably performed by first slurrying finely divided particles of the supported platinum group catalyst in an appropriate solvent, preferably water, to form the slurry. Additional components, such as transition metal oxides, binders, stabilizers, or promoters may also be incorporated in the slurry as a mixture of water soluble or water-dispersible compounds. The slurry preferably contains between 10 to 70 weight percent solids, more preferably between 30 to 50 weight percent. Prior to forming the slurry, the supported platinum group catalyst particles are preferably subject to a size reduction treatment (e.g., milling) such that the average particle size of the solid particles is less than 20 microns in diameter.

The silver-containing extruded zeolite substrate may then be dipped one or more times into the slurry or the slurry may be coated on the substrate such that there will be deposited on the silver-containing extruded zeolite substrate the desired loading of catalytic materials. Alternatively, a slurry containing only the inorganic oxide(s) may first be deposited on the zeolite catalyst-coated substrate to form an inorganic oxide-coated substrate, followed by drying and calcination steps. The platinum group metal(s) may then be added to the inorganic oxide-coated substrate by any known means, including impregnation, adsorption, or ion-exchange of a platinum group metal compound (such as platinum nitrate).

Preferably, the entire length of the silver-containing extruded zeolite substrate is coated with the slurry so that a washcoat of the supported platinum group catalyst covers the entire surface of the substrate.

After the silver-containing extruded zeolite substrate has been coated with the supported platinum group catalyst slurry, the coated substrate is preferably dried and then calcined by heating at an elevated temperature to form the three-way catalyst. Preferably, the calcination occurs at 400 to 600° C. for approximately 1 to 8 hours.

The invention also includes an exhaust system for internal combustion engines comprising the three-way catalyst. The exhaust system preferably comprises one or more additional after-treatment devices capable of removing pollutants from internal combustion engine exhaust gases.

Preferably, the exhaust system comprises a close-coupled catalyst and the three-way catalyst of the invention. The close-coupled catalyst is located upstream of the three-way catalyst. Preferably, a particulate filter may also be added to this system. The particulate filter may be located downstream of the close-coupled catalyst and upstream three-way catalyst, or the particulate filter may be located downstream of the three-way catalyst.

Close-coupled catalysts are well known in the art. Close-coupled catalysts are typically utilized to reduce hydrocarbon emissions during cold start period following the start of the engine when the temperature, as measured at the three-way catalyst, will be below a temperature ranging from about 150 to 220° C. Close-coupled catalysts are located within the engine compartment, typically adjacent to the exhaust manifold and beneath the hood, so that they are exposed to high temperature exhaust gas immediately exiting the engine after the engine has warmed up.

The close-coupled catalyst preferably comprises a substrate structure coated with a catalyst layer of a heat-resistant inorganic oxide containing at least one noble metal selected from Pt, Pd and Rh. The heat-resistant substrate is typically a monolith substrate, and preferably a ceramic substrate or metallic substrate. The ceramic substrate may be made of any suitable heat-resistant refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. The metallic substrate may be made of any suitable metal, and in particular heat-resistant metals and metal alloys such as titanium and stainless steel as well as ferritic alloys containing iron, nickel, chromium, and/or aluminum in addition to other trace metals (typically, rare earth metals).

The substrate is preferably a flow-through substrate, but may also be a filter substrate. The flow-through substrates preferably have a honeycomb structure with many small, parallel thin-walled channels running axially through the substrate and extending throughout the substrate. If the substrate is a filter substrate, it is preferably a wall-flow monolith filter. The channels of a wall-flow filter are alternately blocked, which allow an exhaust gas stream to enter a channel from the inlet, and then flow through the channel walls, and exit the filter from a different channel leading to the outlet. Particulates in the exhaust gas stream are thus trapped in the filter.

The catalyst layer of the close-coupled catalyst is typically added to the substrate as a washcoat that preferably comprises one or more inorganic oxides and one or more platinum group metals. The inorganic oxide most commonly includes oxides of Groups 2, 3, 4, 5, 13 and 14 elements. Useful inorganic oxides preferably have surface areas in the range 10 to 700 $m^2/g$, pore volumes in the range 0.1 to 4 mL/g, and pore diameters from about 10 to 1000 Angstroms. The inorganic oxide is preferably alumina, silica, titania, zirconia, niobia, tantalum oxides, molybdenum oxides, tungsten oxides, rare earth oxides (in particular ceria or neodymium oxide), or mixed oxides or composite oxides of any two or more thereof, e.g. silica-alumina, ceria-zirconia or alumina-ceria-zirconia, and can also be a zeolite. The PGMs comprise one or more of platinum, palladium, and rhodium. The close-coupled catalyst may contain other metals or metal oxides as well.

In another useful embodiment, the exhaust system may also preferably comprise a conventional oxidation catalyst component and the three-way catalyst of the invention. In this configuration, the exhaust system will preferably contain valves or other gas-directing means such that during the cold-start period (below a temperature ranging from about 150 to 220° C., as measured at the three-way catalyst, the exhaust gas is directed to contact the three-way catalyst before flowing to the conventional oxidation catalyst component. Once the after-treatment device(s) reaches the operating temperature (about 150 to 220° C., as measured at the three-way catalyst), the exhaust gas flow is then redirected to contact the conventional oxidation catalyst component prior to contacting the three-way catalyst. A particulate filter may also be added to this by-pass system. U.S. Pat. No. 5,656,244, the teachings of which are incorporated herein by reference, for example, teaches means for controlling the flow of the exhaust gas during cold-start and normal operating conditions.

The conventional oxidation catalyst component is preferably a conventional TWC catalyst that comprises a substrate coated with a TWC layer. The substrate is typically a monolith substrate, and preferably a ceramic substrate or metallic substrate, and is preferably a flow-through substrate but may also be a filter substrate. The TWC catalyst layer preferably comprises a supported platinum group metal catalyst that comprises one or more platinum group metals ("PGM") and one or more inorganic oxide carriers, as described above.

The following examples merely illustrate the invention. Those skilled in the art will recognize many variations that are within the spirit of the invention and scope of the claims.

EXAMPLE 1

Preparation Of Catalysts Of The Invention

Catalyst 1A: Ag on extruded beta zeolite+Pd—Rh Layer

A beta zeolite monolith (formed by extruding beta zeolite into a honeycomb monolith, and containing 55% beta zeolite; see, e.g., U.S. Pat. Nos. 5,492,883, 5,565,394, and 5,633,217) is impregnated with an aqueous silver nitrate solution, followed by drying, and calcining by heating at 500° C. for 4 hours to achieve a Ag loading of 150 $g/ft^3$.

The Ag/beta zeolite monolith is then coated with a typical TWC layer consisting of alumina and ceria-zirconia mixed oxides as the supports for Pd and Rh. The Pd loading is 76.5 $g/ft^3$ and the Rh loading is 8.5 $g/ft^3$. The supported coated substrate is dried, and then calcined by heating at 500° C. for 4 hours.

EXAMPLE 2

Comparative Catalyst Preparation

Comparative Catalyst 2A: Extruded beta zeolite+Pd—Rh Layer

Comparative Catalyst 2A is prepared according to the same procedure as Catalyst 1A with the exception that the extruded beta zeolite is not impregnated with silver.

Comparative Catalyst 2B: Cordierite Substrate+Pd—Rh Layer

Comparative Catalyst 2B is prepared according to the same procedure as Catalyst 1A with the exception that a cordierite substrate monolith is used in place of the Ag/beta zeolite monolith.

EXAMPLE 3

Laboratory Testing Procedures And Results

All the catalysts are tested on core samples (2.54 cm×8.4 cm) of the flow-through catalyst-coated substrate. Fresh catalyst and aged catalyst are both tested. Catalyst cores are aged under flow-through conditions in a furnace under hydrothermal conditions (5% $H_2O$, balance air) at 800° C. for 80 hours. The cores are then tested for hydrocarbon adsorption in a laboratory reactor, using a feed gas stream that is prepared by adjusting the mass flow of the individual exhaust gas components. The gas flow rate is maintained at 21.2 L min$^{-1}$ resulting in a Gas Hourly Space Velocity of 30,000 h$^{-1}$ (GHSV=30,000 h$^{-1}$).

The catalysts are pretreated at 650° C. in a gas flow of 2250 ppm $O_2$, 10% $CO_2$, 10% $H_2O$, and the balance nitrogen, before cooling to room temperature. Following the pretreatment, the catalyst undergoes a HC adsorption step in which the catalyst is contacted for 30 seconds with a HC-containing gas consisting of 1500 ppm ($C_1$ basis) HC (17 vol. % toluene, 24 vol. % isopentane, and 59 vol. % propene), 1000 ppm NO, 1000 ppm CO, 2250 ppm $O_2$, 10% $H_2O$, 10% $CO_2$ and the balance nitrogen. The HC adsorption step is then followed by a HC desorption period in which the catalyst is subjected to a desorption gas consisting of 200 ppm ($C_1$ basis) HC, 300 ppm $O_2$, 10% $H_2O$, 10% $CO_2$ and the balance nitrogen.

The results on the fresh and aged catalysts for the HC emissions during the adsorption period and oxidation period, as well as total HC removed, are shown in Table 1.

EXAMPLE 4

Engine Testing Procedures

Full-sized catalysts of Example 1A and Comparative Examples 2A and 2B are evaluated on a 2.4 L gasoline vehicle. In each of the tests, a commercial Pd—Rh TWC catalyst is placed in the close-coupled position upstream of the Example catalysts. The CCC TWC catalyst contains 405 g/ft$^3$ Pd and 15 g/ft$^3$ Rh in the front zone, and 105 g/ft$^3$ Pd and 15 g/ft$^3$ Rh in the rear zone. Each of the systems is aged for 150 hours with the Example catalyst bed temperature peaking at 800° C. The tailpipe total HC (THC) emissions of the systems under FTP 75 testing protocol are shown in Table 2. Catalyst 1A removes additional 4 mg/mile THC as compared to the two Comparative Examples.

The results are shown in Table 2.

TABLE 1

NOx Storage Capacity Results

| Catalyst | | % HC adsorbed (30 sec; 80° C.) | % HC oxidized (80-650° C.) | Total % HC removed |
|---|---|---|---|---|
| 1A | Fresh | 93.1 | 78.1 | 81.3 |
| | Aged | 90.4 | 62.6 | 68.8 |
| 2A* | Fresh | 83.5 | 70.4 | 73.4 |
| | Aged | 71.7 | 61.7 | 63.9 |
| 2B* | Fresh | 7.8 | 69.8 | 55.9 |
| | Aged | 9.2 | 65.4 | 53.3 |

*Comparative Example

TABLE 2

Engine Testing Results showing Total Hydrocarbon (THC) Emission

| Catalyst | Cumulative Tailpipe THC (mg/mile) |
|---|---|
| 1A | 10 |
| 2A* | 14 |
| 2B* | 14 |

*Comparative Example

We claim:

1. A three-way catalyst comprising: (1) a silver-containing extruded zeolite substrate; and (2) a catalyst layer disposed on the silver-containing extruded zeolite substrate, wherein the catalyst layer comprises a supported platinum group metal catalyst comprising one or more platinum group metals and one or more inorganic oxide carriers, and wherein the silver-containing extruded zeolite substrate comprises from 1 to 700 g/ft$^3$ silver.

2. The three-way catalyst of claim 1 wherein the zeolite is selected from the group consisting of a beta zeolite, a faujasite, an L-zeolite, a ZSM zeolite, an SSZ-zeolite, an AEI framework zeolite, a mordenite, a chabazite, an offretite, an erionite, a clinoptilolite, a silicalite, an aluminum phosphate zeolite, a mesoporous zeolite, a metal-incorporated zeolite, and mixtures thereof.

3. The three-way catalyst of claim 1 wherein the zeolite is selected from the group consisting of beta zeolite, ZSM-5, SSZ-33, Y-zeolite, and mixtures thereof.

4. The three-way catalyst of claim 1 wherein the one or more platinum group metals is selected from the group consisting of platinum, palladium, rhodium, and mixtures thereof.

5. The three-way catalyst of claim 1 wherein the one or more platinum group metals is palladium and rhodium.

6. The three-way catalyst of claim 1 wherein the one or more inorganic oxide carriers is selected from the group consisting of alumina, silica, titania, zirconia, ceria, niobia, tantalum oxides, molybdenum oxides, tungsten oxides, and mixed oxides or composite oxides thereof.

7. The three-way catalyst of claim 1 wherein the extruded zeolite substrate is a flow-through substrate.

8. An exhaust system for internal combustion engines comprising the three-way catalyst of claim 1.

9. The exhaust system of claim 8 further comprising: a selective catalytic reduction catalyst system; a particulate filter; a selective catalyst reduction filter system; a $NO_x$ adsorber catalyst; or combinations thereof.

10. The exhaust system of claim 8 further comprises a close-coupled catalyst.

11. The exhaust system of claim 10 wherein the close-coupled catalyst is located upstream of the three-way catalyst.

12. The exhaust system of claim 11 further comprises a particulate filter.

13. The exhaust system of claim 12 wherein the particulate filter is located downstream of the closed-coupled catalyst and upstream three-way catalyst.

14. The exhaust system of claim 12 wherein the particulate filter is located downstream of the three-way catalyst.

15. The exhaust system of claim 8 further comprises a conventional oxidation catalyst.

16. The exhaust system of claim 15 further comprises a particulate filter.

17. The three-way catalyst of claim 1 wherein the extruded zeolite substrate is a filter substrate.

18. The three-way catalyst of claim 17 wherein the filter substrate is a wall-flow monolith filter.

19. The three-way catalyst of claim 1 wherein the silver-containing extruded zeolite substrate comprises from 10 to 200 g/ft$^3$ silver.

* * * * *